(12) United States Patent
Yeh

(10) Patent No.: US 7,567,808 B2
(45) Date of Patent: Jul. 28, 2009

(54) HANDOVER METHOD USED IN A WIRELESS COMMUNICATION SYSTEM

(75) Inventor: Ping-Chieh Yeh, Sijhih (TW)

(73) Assignee: Qisda Corporation, Taoyuan County (TW)

(*) Notice: Subject to any disclaimer, the term of this patent is extended or adjusted under 35 U.S.C. 154(b) by 647 days.

(21) Appl. No.: 11/206,431

(22) Filed: Aug. 18, 2005

(65) Prior Publication Data

US 2006/0052105 A1    Mar. 9, 2006

(30) Foreign Application Priority Data

Aug. 18, 2004    (TW) ............................... 93124889 A

(51) Int. Cl.
*H04Q 7/00*    (2006.01)
(52) U.S. Cl. .................. 455/436; 466/437; 466/67.11; 466/524; 466/443; 466/550.1; 455/522; 370/331
(58) Field of Classification Search ......... 455/436–444, 455/522, 69, 115.3, 550.1, 425, 524–525, 455/67.11–67.13; 370/331–332, 328, 338, 370/318
See application file for complete search history.

(56) References Cited

U.S. PATENT DOCUMENTS

| | | | |
|---|---|---|---|
| 6,006,093 A * | 12/1999 | Aalto et al. ................. | 455/443 |
| 6,163,694 A * | 12/2000 | Lind et al. ................. | 455/435.3 |
| 6,259,927 B1 * | 7/2001 | Butovitsch et al. .......... | 455/522 |
| 6,539,233 B1 * | 3/2003 | Taketsugu .................... | 455/522 |
| 6,587,690 B1 * | 7/2003 | Di Huo et al. .............. | 455/446 |
| 6,999,434 B1 * | 2/2006 | Agrawal et al. ............. | 370/331 |
| 7,006,473 B2 * | 2/2006 | Zhao .......................... | 370/332 |
| 2003/0235163 A1 | 12/2003 | Montz et al. | |
| 2004/0131029 A1 * | 7/2004 | Tobe et al. ................... | 370/331 |
| 2004/0152470 A1 * | 8/2004 | Spain ....................... | 455/456.1 |
| 2004/0203596 A1 * | 10/2004 | Sreemanthula et al. ...... | 455/411 |

OTHER PUBLICATIONS

"Handoff in the Cellular Mobile Communication System" Young-Sheng Chang et al., Apr. 30, 1998.

* cited by examiner

*Primary Examiner*—Kamran Afshar

(57) ABSTRACT

A handover method used in a wireless communication system for handing over a mobile device from a first base station to a second base station is provided. Firstly, a first signal power between the mobile device and the first base station as well as a second signal power between the mobile device and the second base station are respectively measured by the mobile device. Next, the first signal power is compared with the second signal power, and an equal signal power is generated if the two signal powers are substantially the same. Then, the mobile device is handed over to the second base band if the signal power between the mobile device and the first base station is measured by the mobile device to have the same level with the equal signal power.

13 Claims, 5 Drawing Sheets

HANDOVER METHOD USED IN A WIRELESS COMMUNICATION SYSTEM

This application claims the benefit of Taiwan application Serial No. 93124889, filed Aug. 18, 2004, the subject matter of which is incorporated herein by reference.

BACKGROUND OF THE INVENTION

1. Field of the Invention

The invention relates in general to a handover method, and more particularly to a handover method used in a wireless communication system.

2. Description of the Related Art

Referring to FIG. 1, a diagram of a wireless communication system is shown. A wireless communication system 100, such as a GSM system, a CDMA system or a wireless LAN, includes a cell 102 of a first base station 101 and a cell 112 of a second base station 111. The wireless communication system 100 provides wireless Internet access or wireless communication to a mobile device 120. The mobile device 120 can be a mobile phone or a portable device with wireless Internet access such as a mobile phone or a personal digital assistant (PDA) for instance.

Suppose initially, the mobile device 120 is at position A and communicates with the first base station 101. The first base station 101 transmits a first signal, while the second base station 111 transmits a second signal. Position D is the farthest position that the first signal emitted by the first base station 101 can reach. The mobile device 120 can no longer receive the first signal from the first base station 101 beyond the position D. In other words, the signal power required for the mobile device 120 to receive the first signal from the first base station 101 at position D is a predetermined power value. Therefore, the mobile device 120 must be handed over to the second base station 111 from the first base station 101 before reaching position D, lest data might be lost.

The conventional handover method is exemplified below. During the movement of the mobile device 120, the mobile device 120 compares the power of the first signal emitted by the first base station 101 and measured the power of the second signal emitted by the second base station 111. When the mobile device 120 is at position P, the power from the first base station 101 is smaller than the power from the second base station; the mobile device 120 is handed over to perform communication via the base station 112.

However, if the decision of handover is determined according to the signal power of the base station received by the mobile device 120 is larger than a fixed value, unnecessary handovers would occur and cause extra burden to the wireless communication system. For example, the received power of the first signal emitted by the first base station still suffices to maintain a good communication when the mobile device 120 may move around position P for a while. If the mobile device is handed over simply because the received power of the second signal from the second base station is slightly larger, there would be too many handovers which cause extra burden to the wireless communication system. If the mobile device 120 is handed over when the received power of the second signal emitted by the second base station is larger than a fixed value, data loss would occur because the mobile device 120 moves too fast. The mobile device 120 might have no enough time to process the handoff procedures and data transmission.

SUMMARY OF THE INVENTION

It is therefore an object of the invention to provide an efficient handover method.

According to the object of the invention, a handover method used in a wireless communication system for handing over a mobile device from a first base station to a second base station is provided. The first base station emits a first signal, while the second base station emits a second power. Firstly, a first signal power level between the mobile device and the first base station and a second signal power level between the mobile device and the second base station are respectively measured by the mobile device. Next, the first signal power level is compared with the second signal power level, and an equal signal power level is generated if the two signal power levels are substantially of the same level. The mobile device estimates a handover power level ranging between the equivalent signal power level and the predetermined power value level. The mobile device hands the mobile device over to the second base station if the first signal power level is equal to the handover power value level.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
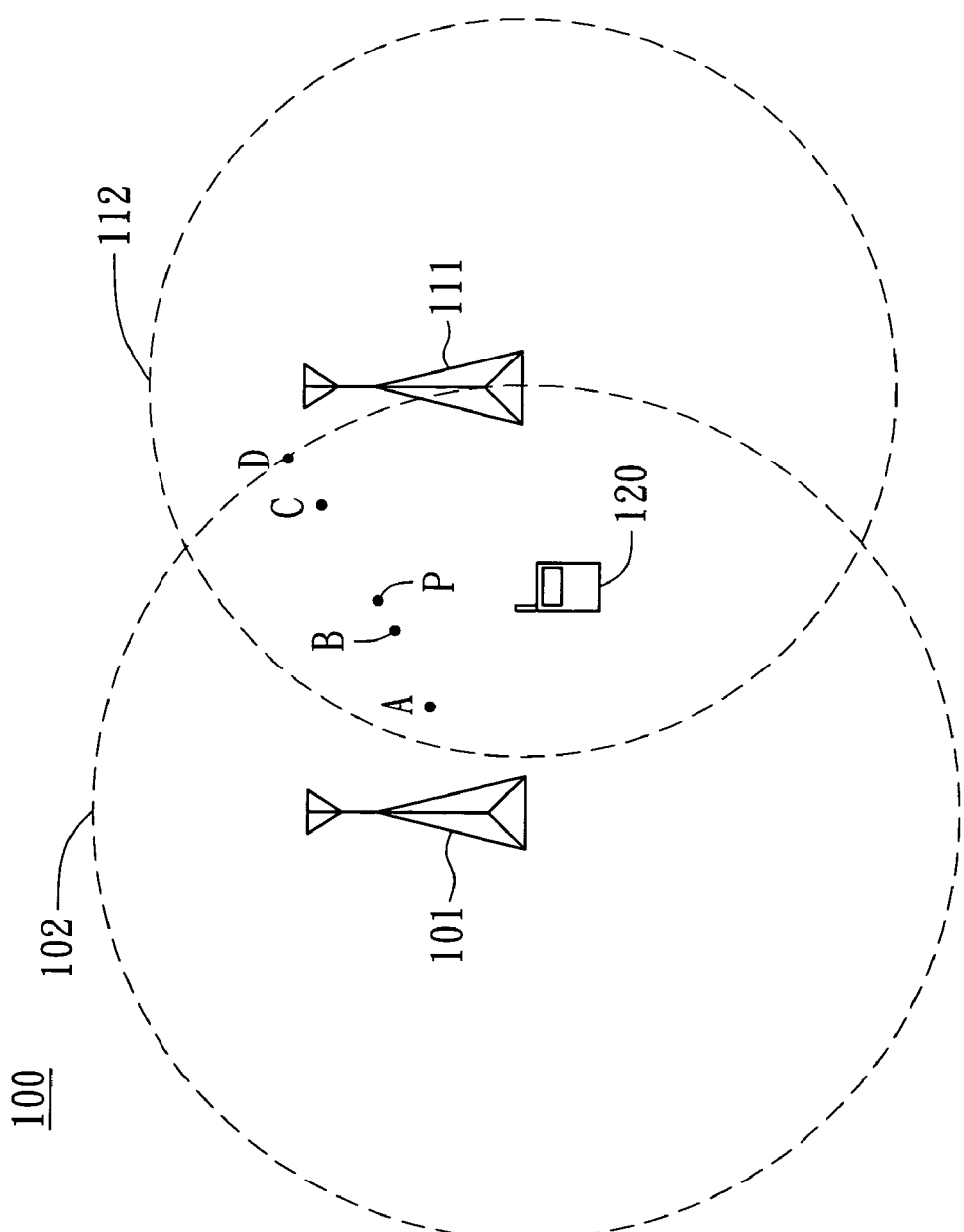
FIG. 1 is a diagram of wireless communication system.
Figure 2:
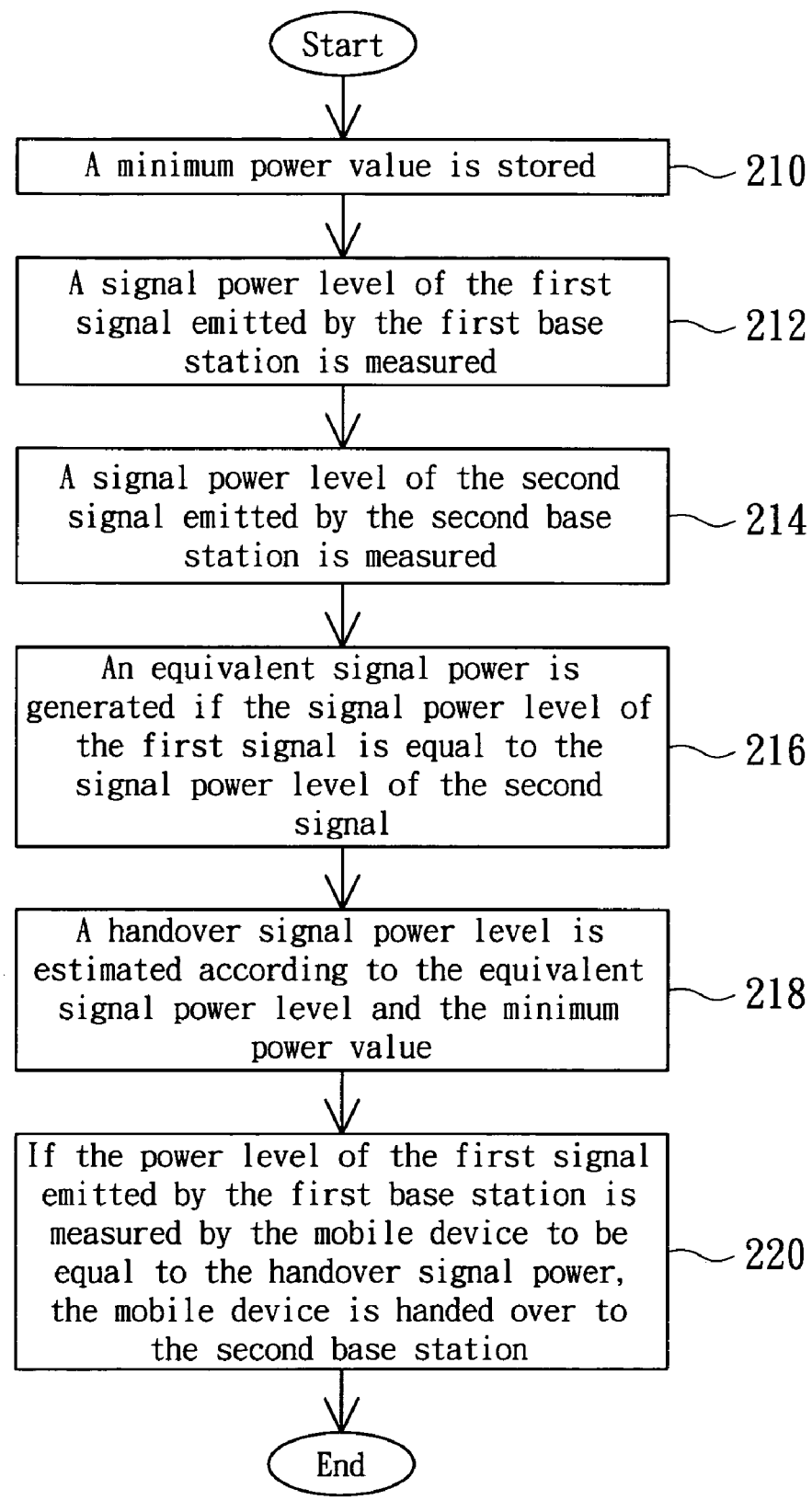
FIG. 2 is a flowchart of a handover method according to a preferred embodiment of the invention.

Referring to FIG. 2, a flowchart of a handover method according to a preferred embodiment of the invention is shown. Also refer to FIG. 1. Initially, the mobile device 120 is at position A and communicates with the first base station 101. The first base station 101 emits a first signal and the second base station 111 emits a second signal. Position D is the farthest position that the first signal emitted by the first base station 101 can reach. The mobile device 120 can no longer receive the first signal from the first base station 101 beyond the position D. In other words, the signal power level required for the mobile device 120 to receive the first signal from the first base station 101 at position D is a minimum power value Pm. Therefore, the mobile device 120 must be handed over before reaching position D.

Firstly, a predetermined power level, the minimum power, Pm is stored at the mobile device 120 as shown in step 210. Next, during the course of movement, the mobile device 120 continues to receive and measure signal power level P1 of the first signal emitted by the first base station 101 and receive and measure signal power level P2 of the second signal emitted by the second base station 111 as shown in step 212 and step 214. If the signal power level P1 is measured by the mobile device 120 to be equal to the signal power level P2 when the mobile device 120 is at position B for instance, the mobile device 120 would store and record the present signal power as an equivalent signal power Pe as shown in step 216, the equivalent signal power level may be equal to the first power level. The mobile device 120 would estimate a handover signal power level Ph according to the equivalent signal power level Pe and the predetermined power level Pm as shown in step 218. The handover signal power level Ph ranging between the equivalent signal power level Pe and the minimum power level Pm is obtained according to a predetermined ratio. For example, Ph=(Pe−Pm)/n+Pm, wherein n is a positive integer such as 8 for instance.

During the course of movement, if the power level of the first signal emitted by the first base station 101 is received and measured by the mobile device 120 to be equal to the handover signal power level Ph when the mobile device is at position C for instance, the mobile device 120 starts to be handed over to the second base station 111 as shown in step 220.

The handover signal power level Ph can further be determined according to a traveling rate of the mobile device 120. If the traveling rate is too fast, the value of the handover signal power Ph can be increased, so that the mobile device 120 is handed over when farther away from the position D, that is, the handover occurs earlier. If the traveling rate slows down, the value of the handover signal power level Ph can be decreased, so that the mobile device 120 is handed over when closer to the position D, that is, the handover occurs later.

Figure 5:
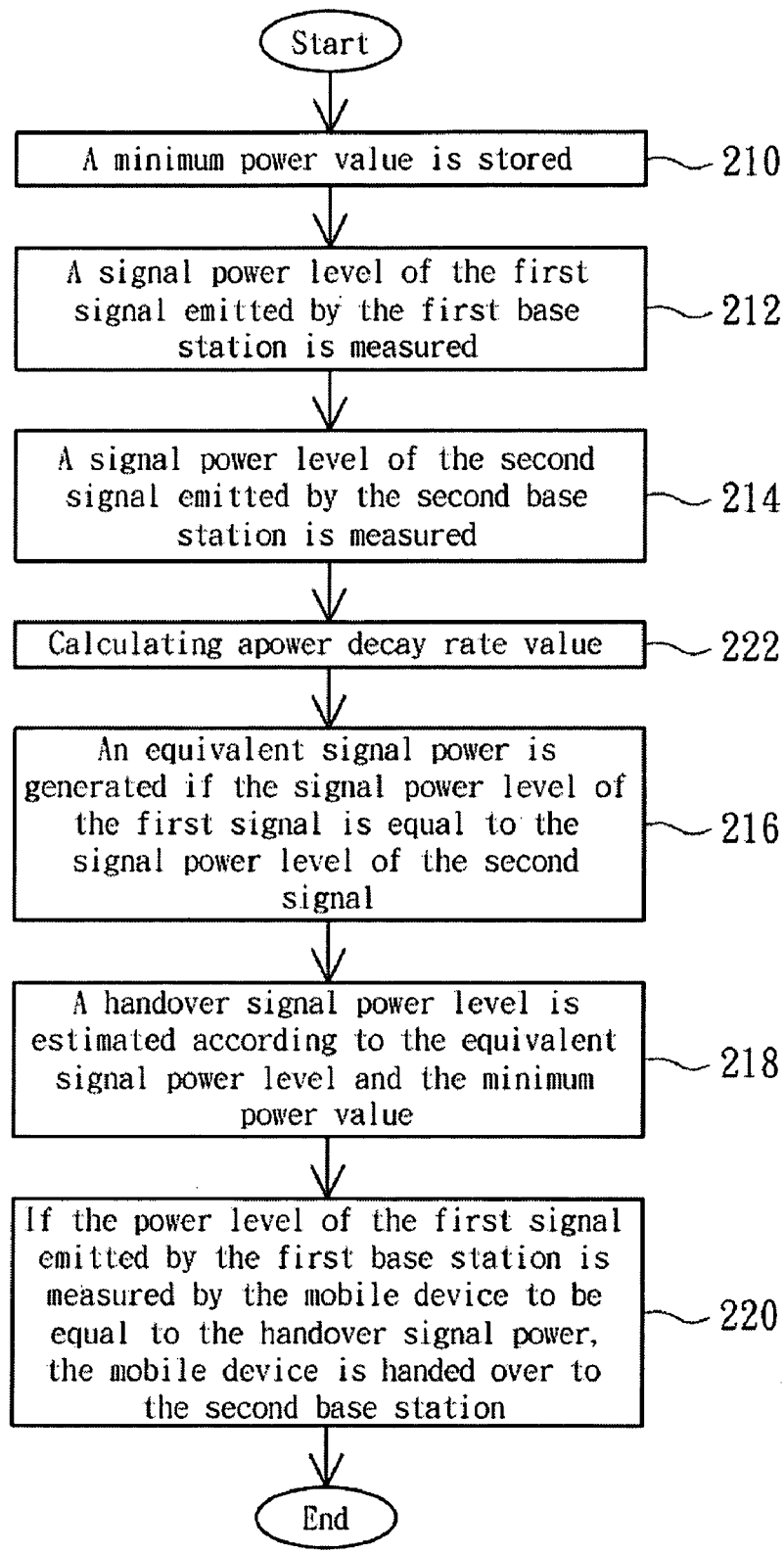
FIG. 5 is a flowchart of a handover method according to another embodiment of the invention.

When the mobile device 120 is moving away from the first base station 101, from position A towards position D for example, the traveling rate of the mobile device 120 is positively proportional to the decay rate of the signal power. Therefore, the power decay rate Vp can be used as a reference index of the traveling rate of the mobile device 120. In an example, as shown in FIG. 5, a power decay rate Vp is calculated in step 222 before the equivalent signal power Pe is generated in step 216. For example, the received signal power level Pa of the first signal is recorded when the mobile device 120 is at position A. The received power level of the first signal is equal to Pe and the power decay rate Vp is equal to (Pa−Pe)/t when the mobile device 120 moves to position B after time t.

If the power decay rate Vp is larger, the value of the handover signal power level Ph can be increased, so that the handover occurs earlier. If the power decay rate Vp is smaller, the value of the handover signal power level Ph can be decreased, so that the handover occurs later when the mobile device 120 is further closer to position D.

The present embodiment defines the above handover timing and avoids data loss during handover. From the determination of handover to the completion of the handover would take a period of time, T1 for instance. So, after handover is determined in step 220, the first base station 101 can transfer the data, which are originally transferred to the mobile device 120 first, to the second base station 112 at the same time before the mobile device 120 is handed over to the second base station 112, so that data loss can be prevented.

According to the power decay rate Vp, the value of the handover signal power Ph can be clearly defined as:

$$Ph = Vp*T1 + Pm \quad (1)$$

Data loss can be prevented if the handover is performed before the time T1. Therefore, the signal power level before the time T1 can be estimated according to the power decay rate Vp. Handover is performed if the signal power level between the mobile device 120 and the first base station 101 is measured by the mobile device 120 to be equal to the handover power level Ph.

It can be seen from equation (1) that the larger the power decay rate Vp, the larger the value of the handover signal power level Ph. This denotes that the handover would be performed earlier during the movement of the mobile device 120. On the other hand, when the smaller the power decay rate Vp, the smaller the value of the handover signal power Ph is. This denotes that the handover would be performed later during the movement of the mobile device 120.

The conventional handover method performs handover as long as the position B is passed by as shown in position P of FIG. 1. The method according to the invention does not perform handover until the mobile device 120 is very close to position D, hence reducing unnecessary occurrences of handover and reducing the burden of the wireless communication system. Moreover, the handover timing can be adjusted according to the traveling rate of the mobile device 120.

Figure 3:
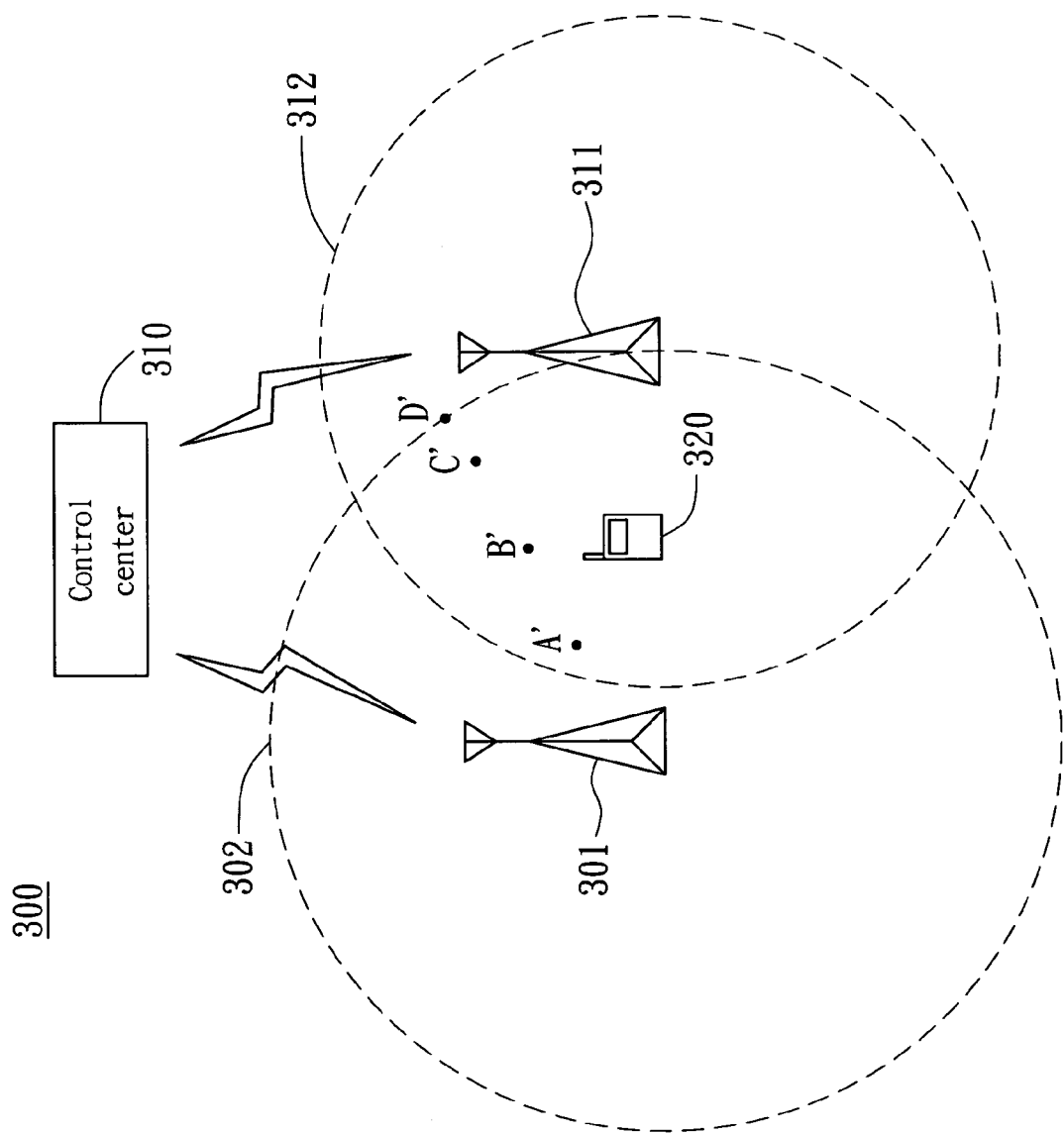
FIG. 3 is a diagram of GSM system.

The handover method of the present embodiment can be used in a wireless communication system such as a GSM system and a wireless LAN system for instance. The application of the handover method of the present embodiment in the GSM system is disclosed below. FIG. 3 is a diagram of GSM system. The GSM system 310 includes a first base station 301, a second base station 311 and a control center 310. Initially, the mobile phone 320 is at position A' and performs communication via the first base station 301. The first base station 301 transfers the signal emitted by the mobile phone 320 to the control center 310. The control center 310 transfers the signal to mobile phone 320 via the first base station 301. The minimum power level for the power of the first signal emitted by the first base station 301 to be received by the mobile phone 320 must be Pm'.

During the course of movement, the mobile phone 320 continues to receive and measure the signal power level P1' of the first signal emitted by the first base station 301 and receive and measure the signal power level P2' of the second signal emitted by the second base station 311. If the signal power level P1' is measured by the mobile phone 320 to be equal to the signal power level P2' when the mobile device 320 is at position B' for instance, the mobile phone 320 would store and record the present signal power level as an equivalent signal power Pe'. The mobile phone 320 or the control center 310 estimates the handover signal power level Ph according to the equivalent signal power level Pe and the minimum power level Pm. During the course of movement, if the signal power level between the mobile phone 320 and the first base station 301 is measured by the mobile phone 320 to be equal to the handover signal power level Ph when the mobile phone 320 is at position C' for instance, the control center 310 starts to transfer the subsequent data to the second base station 311, meanwhile, the mobile phone 320 is handed over to the second base station 311.

Figure 4:
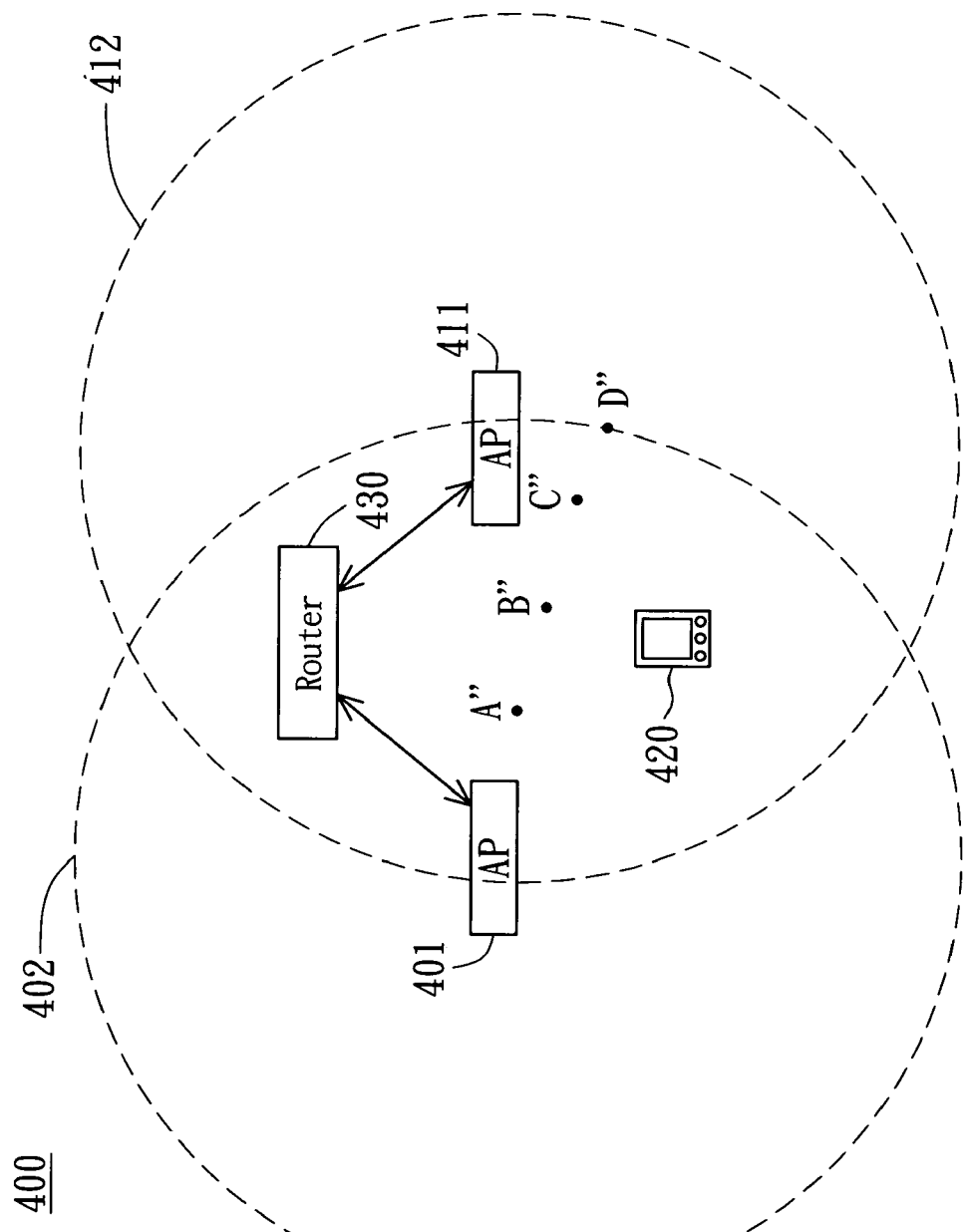
FIG. 4 is a diagram of wireless LAN system.

The application of the present embodiment handover method in a wireless LAN system is exemplified below. FIG. 4 is a diagram of wireless LAN system. A wireless LAN system 400 includes a first base station 401, a second base station 411 and a router 430. Both the first base station 401 and the second base station 402 are a wireless access point (AP). The mobile device is exemplified by a personal digital assistant (PDA) 420. Initially, the PDA 420 is at position A' and is connected to the Internet via the first base station 401 and the router 430. The first base station 401 and the second base station 402 are together coupled to the router 430. The minimum power level for the power of the first signal emitted by the first base station 401 to be received by the PDA 420 must be Pm".

During the course of movement, the PDA 420 continues to receive and measure the signal power level P1" of the first signal emitted by the first base station 401 and to receive and measure the signal power level P2" of the second signal emitted by the second base station 411. If the signal power level P1" is measured by the PDA 420 to be equal to the signal power level P2" when the PDA 420 is at position B" for instance, the PDA 420 would store and record the present signal power level as an equivalent signal power level Pe". The PDA 420 or control center 310 obtains the handover signal power Ph according to the equivalent signal power Pe" and the minimum power value Pm". During the course of movement, if the power of the first signal emitted by the first base station 401 is received and measured by the PDA 420 to be equal to the handover signal power level Ph" when the PDA 420 is at position C" for instance, the PDA 420 is handed over to the second base station 411.

Before the PDA 420 is handed over to the second base station 411, a copy of the packet originally to be transferred to the PDA 420 is made and transferred to the second base station 411. According to a common practice, the packet is transferred to the second base station 411 by the first base station 401. According to another practice, the packet originally to be transferred to the PDA 420 is transmitted to the first base station 401 the second base station 411 via the network by the router 430 transfers.

The handover method disclosed in above embodiment of the invention reduces unnecessary occurrences of handover. Moreover, the handover timing can be adjusted according to the traveling rate of the mobile device so as to effectively reduce the burden of the wireless communication system.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A handover method for a mobile device in a wireless communication system, the wireless communication system having a first base station and a second base station, the mobile device receiving a first signal from the first base station and receiving a second signal from the second base station, the method comprising:
    storing a predetermined power level;
    measuring a first power level of the first signal and a second power level of the second signal; recording the first power level as an equivalent power level when the first and the second power level are substantially equivalent;
    estimating a handover power level which is between the equivalent signal power level and the predetermined power value level; and handing the mobile device over to the second base station if the first signal power level is substantially equal to the handover power value level;
    calculating a power decay rate value; and
    determining the handover power level according to the power decay rate value,
    the equivalent signal power level and the predetermined power level.

2. The handover method according to claim 1, wherein the step of handing the mobile device over to the second base station comprises:
    transferring at least a subsequent data between the first base station and the mobile device simultaneously to the second base station by the first base station; and
    handing the mobile device over to the second base station.

3. The handover method according to claim 2, wherein the wireless communication system is a GSM system.

4. The handover method according to claim 2, wherein the wireless communication system is a wireless LAN, and both the first base station and the second base station are a wireless access point (AP).

5. The handover method according to claim 1, wherein the wireless communication system is a wireless LAN, both the first base station and the second base station are a wireless access point, and the first base station and the second base station are coupled to a network via a router.

6. The handover method according to claim 5, wherein the step of handing the mobile device over to the second base station comprises:
    transferring at least a subsequent data between the router and the mobile device simultaneously to the first base station and to the second base station by the router; and
    handing the mobile device over to the second base station.

7. The handover method according to claim 1, wherein the equivalent signal power level is equal to the first power level when the first power level and the second power level are substantially the equivalent.

8. A handover method for a mobile device in a wireless communication system, the wireless communication system having a first base station and a second base station, the mobile device receiving a first signal from the first base station and receiving a second signal from the second base station, the method comprising:
    storing a predetermined power level;
    measuring a first power level of the first signal and a second power level of the second signal;
    recording the first power level as an equivalent power level when the first and the second power level are substantially equivalent;
    estimating a handover power level ranging between the equivalent signal power level and the predetermined power value level;
    handing the mobile device over to the second base station if the first signal power level is substantially equal to the handover power value level;
    calculating a power decay rate value; and
    determining the handover power level according to the power decay rate value, the equivalent signal power level and the predetermined power level.

9. The handover method according to claim 8, wherein the power decay rate value is generated by:
    measuring a third power level of the first signal at a first time point;
    measuring a fourth power level of the first signal at a second time point;
    generating the power decay rate value according to the difference between the fourth signal power and the third signal power and the time difference between the first time point and the second time point.

10. A wireless communication system for a mobile device to communicate the wireless communication system, the system comprising:
    a first base station emitting a first signal, the mobile device initially communicating with the first base station; and
    a second base station emitting a second signal;
    wherein the mobile device measures a first power level of the first signal and a second power level of the second signal and records the first power level as an equivalent power level when the first and the second power level are substantially equivalent,
    wherein the mobile device generates a handover power level according to the equivalent signal power level, the handover power level is between the equivalent signal power level and a predetermined power level, and the mobile device hands over to the second base station when the power level of the first signal measured by the mobile device is substantially equal to the handover power value;
    calculating a power decay rate value; and
    determining the handover power level according to the power decay rate value, the equivalent signal power level and the predetermined power level.

11. The system according to claim 10, wherein the first base station transfers at least a subsequent data between the first base station and the mobile device simultaneously to the second base station before the system hands the mobile device over to the second base station.

12. The handover method according to claim 10, wherein the wireless communication system is a GSM system.

13. The handover method according to claim 10, wherein the wireless communication system is a wireless LAN, and both the first base station and the second base station are a wireless access point (AP).

* * * * *